United States Patent
Nogawa

(10) Patent No.: US 10,129,922 B2
(45) Date of Patent: Nov. 13, 2018

(54) COMMUNICATION APPARATUS

(71) Applicant: Brother Kogyo Kabushiki Kaisha, Nagoya-shi, Aichi-ken (JP)

(72) Inventor: Hideki Nogawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 63 days.

(21) Appl. No.: 15/455,782

(22) Filed: Mar. 10, 2017

(65) Prior Publication Data

US 2017/0265244 A1 Sep. 14, 2017

(30) Foreign Application Priority Data

Mar. 11, 2016 (JP) .................................. 2016-048506

(51) Int. Cl.
- *H04W 76/18* (2018.01)
- *H04W 76/19* (2018.01)
- *H04W 76/15* (2018.01)
- *H04W 12/06* (2009.01)

(52) U.S. Cl.
CPC .......... *H04W 76/18* (2018.02); *H04W 12/06* (2013.01); *H04W 76/15* (2018.02); *H04W 76/19* (2018.02)

(58) Field of Classification Search
None
See application file for complete search history.

(56) References Cited

U.S. PATENT DOCUMENTS

| 7,769,837 B2 | 8/2010 | Nogawa et al. |
| 8,457,085 B2 | 6/2013 | Izaki |
| 2005/0083894 A1 | 4/2005 | Tagawa |
| 2005/0148326 A1 | 7/2005 | Nogawa et al. |

(Continued)

FOREIGN PATENT DOCUMENTS

| JP | 2005-174134 A | 6/2005 |
| JP | 2007-295084 A | 11/2007 |

(Continued)

OTHER PUBLICATIONS

Apr. 7, 2017—U.S. Non-Final Office Action—U.S. Appl. No. 14/300,772.
Wi-Fi Alliance Technical Committee P2P Task Group, "Wi-Fi Peer-to Peer (P2P) Technical Specification", Version 1.1, pp. 1-159, 2010.
Jun. 17, 2016—U.S. Non-Final Office Action—U.S. Appl. No. 14/300,772.
Nov. 10, 2016—U.S. Final Office Action—U.S. Appl. No. 14/300,772.
Feb. 14, 2017—(JP) Notification of Reason for Rejection—App 2013-122864—Eng Tran.
Jun. 10, 2014—(US) Co-pending U.S. Appl. No. 14/300,772.
Jun. 30, 2017—U.S. Final Office Action—U.S. Appl. No. 14/300,772.

(Continued)

*Primary Examiner* — Andrew Lai
*Assistant Examiner* — Jamaal R Henson
(74) *Attorney, Agent, or Firm* — Banner & Witcoff, Ltd.

(57) ABSTRACT

A communication apparatus may perform: establishing a first wireless connection with the external apparatus while a wireless interface is operating in a capable state; attempting a predetermined process including a receiving process and an establishing process in a case where the first wireless connection is established, the receiving process being for receiving setting information from the external apparatus, and the establishing process being for establishing a second wireless connection with an access point; controlling wireless interface to: in a case where the second wireless (Continued)

connection is established, operate in an incapable state, and in a case where the second wireless connection is not established, operate in the capable state, in a case where the second wireless connection is not established; re-establishing the first wireless connection with the external apparatus; and re-attempting the predetermined process.

16 Claims, 8 Drawing Sheets

(56) References Cited

U.S. PATENT DOCUMENTS

| | | | |
|---|---|---|---|
| 2009/0046686 A1 | 2/2009 | Izaki | |
| 2011/0069832 A1 | 3/2011 | Tang | |
| 2012/0106396 A1 | 5/2012 | Sakai | |
| 2013/0148149 A1 | 6/2013 | Park et al. | |
| 2013/0148162 A1* | 6/2013 | Park | G06F 3/1296 358/1.15 |
| 2013/0223279 A1 | 8/2013 | Tinnakornsrisuphap et al. | |
| 2013/0250358 A1 | 9/2013 | Suzuki | |
| 2013/0260683 A1 | 10/2013 | Suzuki et al. | |
| 2014/0071807 A1 | 3/2014 | Tohzaka et al. | |
| 2014/0362841 A1 | 12/2014 | Shibata | |
| 2015/0334749 A1* | 11/2015 | Goto | H04W 8/005 370/254 |
| 2016/0066361 A1* | 3/2016 | Ogawa | H04W 72/0453 370/315 |

FOREIGN PATENT DOCUMENTS

| | | |
|---|---|---|
| JP | 2009-044701 A | 2/2009 |
| JP | 2011-015285 A | 1/2011 |
| JP | 2012-100171 A | 5/2012 |
| JP | 2014-241487 A | 12/2014 |

* cited by examiner

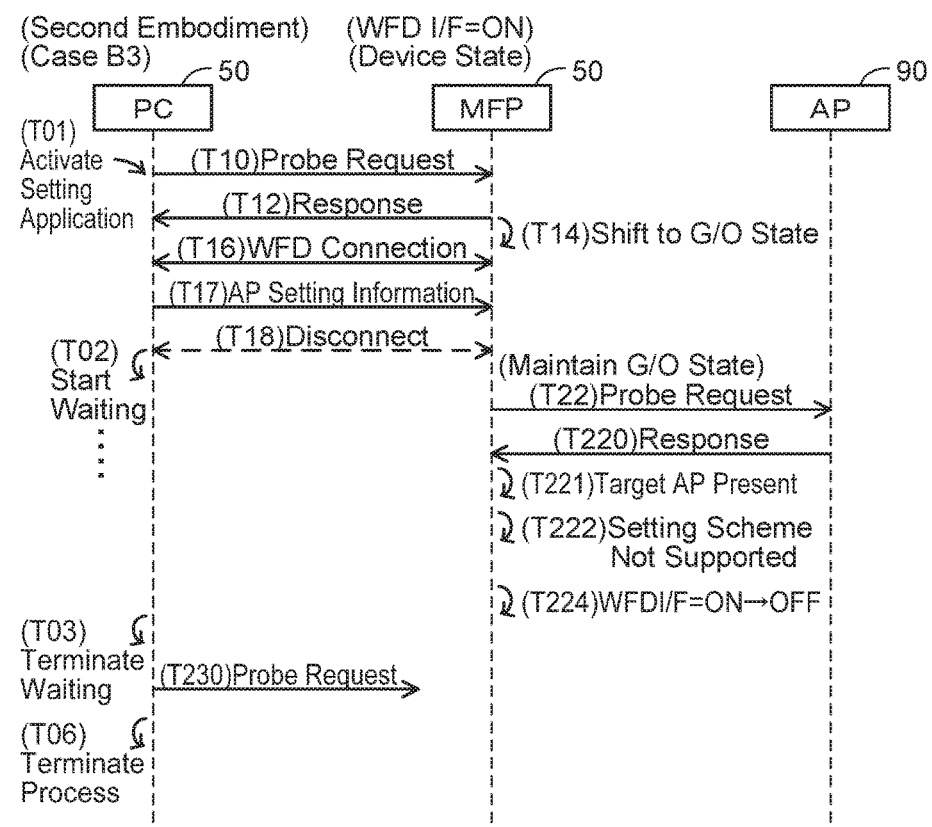

COMMUNICATION APPARATUS

TECHNICAL FIELD

An art disclosed herein relates to a communication apparatus capable of establishing wireless connection with an external apparatus.

DESCRIPTION OF RELATED ART

A conventional MFP (abbreviation of Multi-Function Peripheral) activates a SoftAP (AP is abbreviation of Access Point) when an operation for starting connection is inputted thereto, and establishes SoftAP connection with a mobile terminal. The MFP receives a wireless setting value being used by an AP from the mobile terminal by using the SoftAP connection, and establishes a normal Wi-Fi connection with the AP by using the wireless setting value.

SUMMARY

The above MFP terminates the SoftAP regardless of whether or not the MFP establishes a normal Wi-Fi connection with the AP. Due to this, under a situation where the MFP cannot establish the normal Wi-Fi connection with the AP, a user has to re-input the operation for starting connection to the MFP to cause the MFP to re-attempt the process for establishing the normal Wi-Fi connection with the AP.

The present disclosure provides an art that may improve convenience of a user under a situation where a communication apparatus is to establish a wireless connection with an access point.

A communication apparatus disclosed herein may comprise: a wireless interface configured to operate in any one of a plurality of states including a capable state where the wireless interface is capable of performing a specific process for establishing a first wireless connection with an external apparatus and an incapable state where the wireless interface is incapable of performing the specific process; a processor; and a memory storing computer-readable instructions therein, the computer-readable instructions, when executed by the processor, causing the communication apparatus to perform: establishing the first wireless connection with the external apparatus via the wireless interface while the wireless interface is operating in the capable state; attempting a predetermined process including a receiving process and an establishing process in a case where the first wireless connection is established with the external apparatus, the receiving process being for receiving setting information from the external apparatus by using the first wireless connection, and the establishing process being for establishing a second wireless connection with an access point different from the external apparatus via the wireless interface by using the setting information; controlling the wireless interface to: in a case where the second wireless connection is established with the access point as a result of the predetermined process being attempted, operate in the incapable state without an instruction for causing the wireless interface to operate in the incapable state being inputted by a user, and in a case where the second wireless connection is not established with the access point as the result of the predetermined process being attempted, operate in the capable state without an instruction for causing the wireless interface to operate in the capable state being inputted by the user; in the case where the second wireless connection is not established with the access point as the result of the predetermined process being attempted, re-establishing the first wireless connection with the external apparatus via the wireless interface while the wireless interface is operating in the capable state after the first wireless connection has been disconnected; and re-attempting the predetermined process in a case where the first wireless connection is re-established with the external apparatus.

A control method and computer-readable instructions for implementation of the communication apparatus described above, and a non-transitory computer-readable recording medium in which the computer-readable instructions are stored, are also novel and useful. Further, a communication system including the above communication apparatus, the external apparatus, and the access point is also novel and useful.

BRIEF DESCRIPTION OF DRAWINGS

FIG. 8 illustrates a sequence diagram of Case B3 of the second embodiment in which the AP setting schemes are not supported.

EMBODIMENTS

Figure 1:
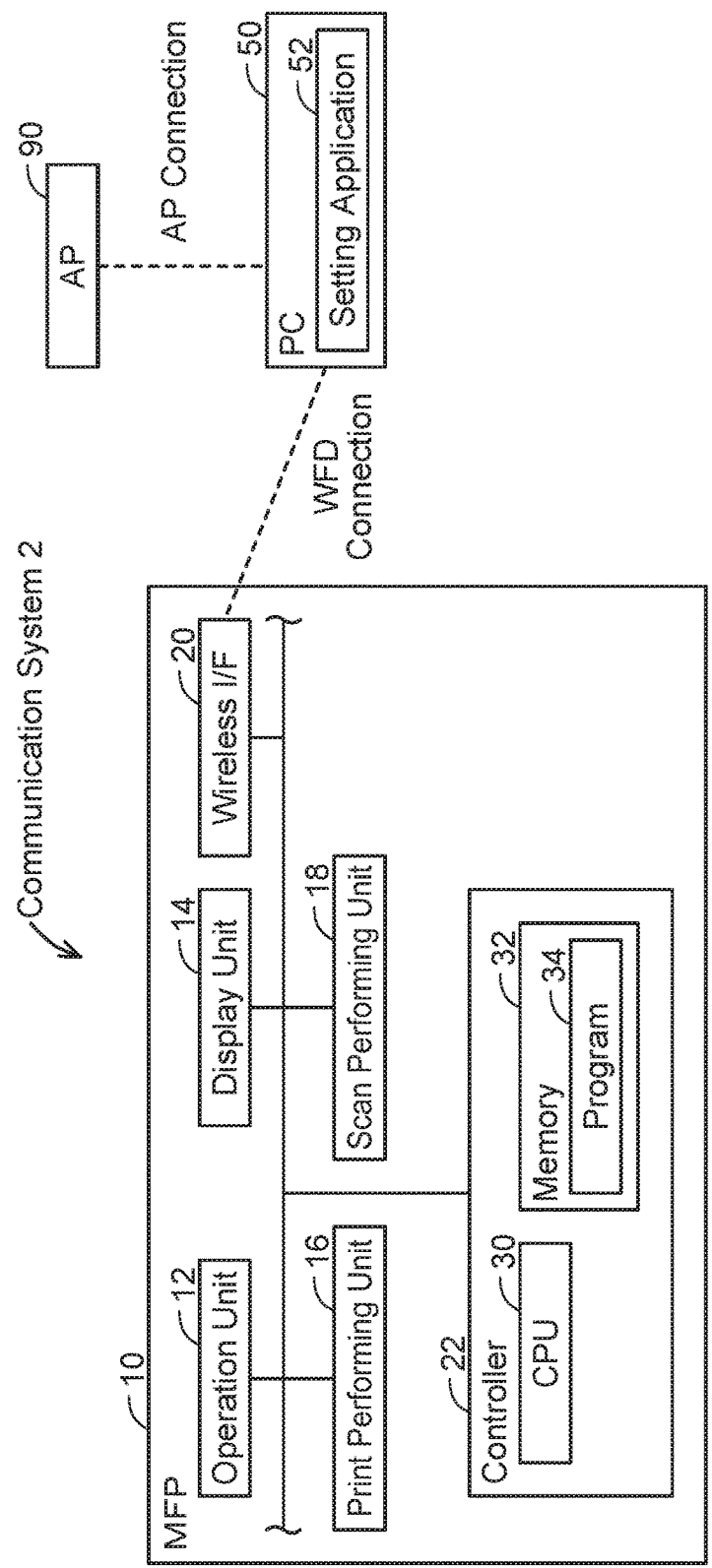
FIG. 1 illustrates a configuration of a communication system.

First Embodiment (Configuration of Communication System 2; FIG. 1)

As indicated in FIG. 1, a communication system 2 comprises a MFP 10, a PC (abbreviation of personal computer) 50, and an AP (abbreviation of Access Point) 90. These devices 10, 50, and 90 are wirelessly communicable with each other.

(Configuration of MFP 10)

The MFP 10 is a peripheral apparatus (i.e., peripheral apparatus of the PC 50) capable of performing multiple functions including print function and scan function, and comprises an operation unit 12, a display unit 14, a print performing unit 16, a scan performing unit 18, a wireless interface (hereinafter, "wireless I/F") 20, and a controller 22. The operation unit 12 comprises a plurality of keys. A user is able to input various kinds of instructions into the MFP 10 by operating the operation unit 12. The display unit 14 is a display for displaying various kinds of information. The display unit 14 is a so-called touch panel, and functions as an operation unit as well. The term "operation unit 12" hereinafter may mean both the operation unit 12 itself and the display unit 14 being a touch panel. The print performing unit 16 is a printing mechanism using ink-jet method, laser method, etc. The scan performing unit 18 is a scan mechanism such as CCD, CIS, etc.

The wireless I/F 20 is an I/F for performing wireless communication complying with a normal Wi-Fi scheme. The normal Wi-Fi scheme is a wireless communication scheme conforming to standards formulated by the Wi-Fi Alliance, and for example, is IEEE (abbreviation of The Institute of Electrical and Electronics Engineers, Inc.) 802.11 standards, and standards conforming thereto (e.g., 802.11a,11b,11g,11n). The MFP 10 is capable of belonging to a normal Wi-Fi network formed by the AP 90 (hereinafter called "APNW") by establishing wireless connection with the AP 90 (hereinafter called "AP connection") in accordance with the normal Wi-Fi scheme.

The wireless I/F 20 further supports a WFD scheme. Details of the WFD scheme are described in "Wi-Fi Peer-to-Peer (P2P) Technical Specification Version1.1" created by the Wi-Fi Alliance. Moreover, details of the WFD scheme are disclosed in US Patent Application Publication No. 2013/0260683 also, which is herein incorporated by reference. The MFP 10 is capable of belonging to a WFD network (hereinafter called "WFDNW") formed by the MFP 10 or PC 50 by establishing connection (hereinafter called "WFD connection") with the PC 50 in accordance with the WFD scheme.

In the present embodiment, the wireless I/F 20 is incapable of concurrently performing wireless communication in accordance with the normal Wi-Fi scheme (hereafter "AP communication") and wireless communication in accordance with the WFD scheme (hereafter "WFD communication"), and also capable of selectively performing only one of those wireless communications. Alternatively, in a modification, the wireless I/F 20 may be capable of performing concurrently the AP communication and the WFD communication.

The wireless I/F 20 is capable of operating in either of a state where the wireless I/F 20 is capable of performing the WFD communication or a state where the wireless I/F 20 is incapable of performing the WFD communication. Hereafter, the former state and the latter state will be denoted respectively as "state where a WFD I/F is on", and "state where the WFD I/F is off". Further, shifting the state where the WFD I/F is on to the state where the WFD I/F is off and shifting the state where the WFD I/F is off to the state where the WFD I/F is on will be denoted as "turning off the WFD I/F" and "turning on the WFD I/F", respectively.

In the state where the WFD I/F is on, the wireless I/F 20 is capable of performing at least a Listen process complying with the WFD scheme. The Listen process is a process for notifying apparatuses existing around the MFP 10 of a presence of the MFP 10 by receiving a probe request and sending a response thereto. In the state where the WFD I/F is on, the wireless I/F 20 is further capable of performing communication of signals unique to the WFD scheme (e.g., a Provision Discovery signal). In the state where the WFD I/F is off, the wireless I/F 20 is incapable of performing the Listen process and further incapable of performing communication of the aforementioned unique signals. In a modification, in the state where the WFD I/F is on, the wireless I/F 20 may perform a Search process complying with the WFD scheme and may not perform the Listen process. The Search process is a process for being aware of the apparatuses existing around the MFP 10 by sending the probe request and receiving a response thereto.

The controller 22 comprises a CPU 30 and a memory 32. The CPU 30 performs various processes in accordance with a program 34 stored in the memory 32. The memory 32 is configured by a ROM, RAM, hard disk, etc. The memory 32 stores various data obtained or created during a course of the CPU 30 performing respective processes.

(Configuration of PC 50)

The PC 50 is a terminal apparatus such as a desktop PC, tablet PC, notebook PC, etc. The PC 50 comprises an unillustrated wireless I/F. The wireless I/F of the PC 50 is an I/F for performing the AP communication and the WFD communication. The PC 50 has established the AP connection with the AP 90.

A memory of the PC 50 stores an application program 52 (hereafter, "setting application 52") for performing processes for establishing the AP connection between the MFP 10 and the AP 90. The setting application 52 is an application provided by a vendor of the MFP 10, and may for example be installed in the PC 50 from a server on the Internet, or may be installed in the PC 50 from a media delivered with the MFP 10.

(Configuration of AP 90)

The AP 90 is a normal AP called a wireless access point or a wireless LAN router, and differs from G/O (abbreviation of Group Owner) of the WFD scheme and SoftAP. The AP 90 is capable of establishing the AP connection concurrently with plural apparatuses. The AP 90 is capable of relaying communication between a pair of apparatuses (i.e., a pair of child stations) between which the AP connection is established.

Figure 2:
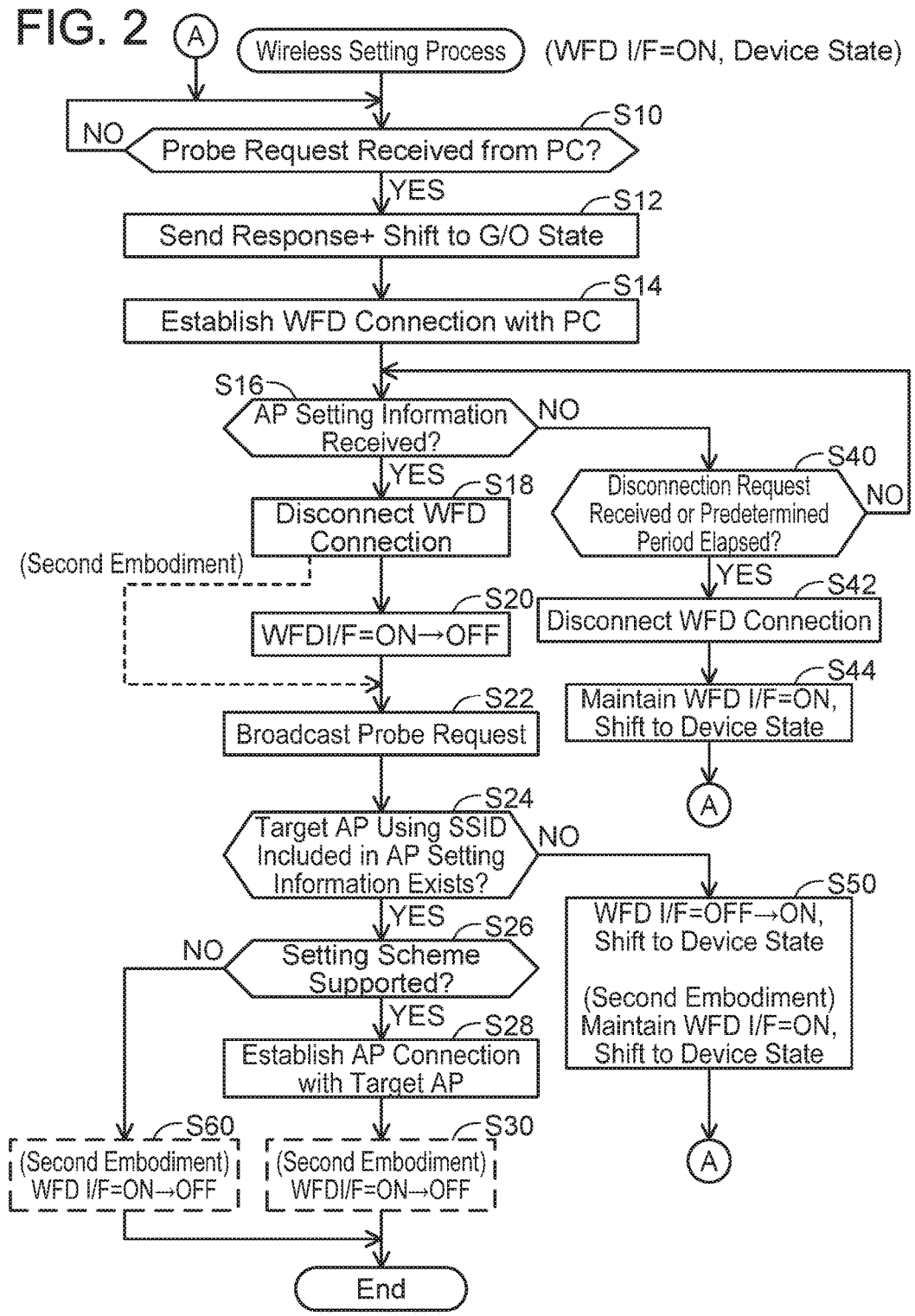
FIG. 2 illustrates a flow chart of a wireless setting process executed by a CPU of an MFP.

(Wireless Setting Process; FIG. 2)

With reference to FIG. 2, a wireless setting process performed by the CPU 30 of the MFP 10 will be described. When one of a first condition and a second condition is fulfilled, the CPU 30 starts processes of FIG. 2, and turns on the WFD I/F. The first condition is a predetermined operation for turning on the WFD I/F being inputted to the operation unit 12 under a state where the WFD I/F is off. The second condition is power being turned on for the first time after a shipment of the MFP 10. In a modification, the conditions for starting the processes of FIG. 2 by turning on the WFD I/F may be either only the first condition or the second condition, or may be another condition (e.g., each time power of the MFP 10 being turned on). It should be noted hereafter that the shift of the WFD I/F from off to on and the shift of the WFD I/F from on to off are performed without an instruction by a user unless a specific trigger is described, such as the input of an operation to the operation unit 12. When the WFD I/F is turned on, the MFP 10 operates in a device state of the WFD scheme. The device state is a state where the MFP 10 is not operating as a parent station or child station of the WFDNW, and performs at least the Listen process. Notably, since all the communications hereinbelow are performed via the wireless I/F 20, the description of "via the wireless I/F 20" may be omitted. Further, in a modification, the MFP 10 may operate in the G/O state of the WFD scheme when the WFD I/F is turned on.

In S10, the CPU 30 performs the Listen process and monitors receiving the probe request from the PC 50. A user of the PC 50 operates an operation unit (not illustrated) of the PC 50 to activate the setting application 52. At this occasion, the PC 50 broadcasts the probe request for searching for the MFP 10 being in the device state. The CPU 30 determines YES in S10 and proceeds to S12 when receiving the probe request from the PC 50.

In S12, the CPU 30 sends a probe response to the PC 50 and further shifts the operating state of the MFP 10 from the device state of the WFD scheme to the G/O state. Due to this, the MFP 10 forms a WFDNW in which the MFP 10 is operating as the parent station. At this timing, the MFP 10 only is belonging to the WFDNW, and no child station is belonging to the WFDNW. In S12, the CPU 30 further creates an SSID (abbreviation of Service Set Identifier) and a password that are used in the WFDNW, and stores them in the memory 32. The SSID and the password are created by a character string being selected randomly. Alternatively in a modification, a predetermined SSID and/or a predetermined password may be used. The SSID and the password are respectively an identifier for identifying a wireless network and data used for authentication and encryption in the wireless network.

In S14, the CPU 30 establishes the WFD connection with the PC 50 from which the probe request has been sent. Specifically, the CPU 30 performs for example communications of various signals including a Provision Discovery signal, Authentication signal, Association signal, WSC Exchange, 4-Way Handshake, etc. with the PC 50. The CPU 30 performs WPS (abbreviation of Wi-Fi Protected Setup) negotiation during the course of these signal communications. In the WPS negotiation, the SSID and password created in S12 are sent from the MFP 10 to the PC 50. The CPU 30 receives the SSID and password from the PC 50 after performing the WPS negotiation, authenticates these, and establishes a WFD connection with the PC 50 in response to success of the authentication. Due to this, the CPU 30 causes the PC 50 to participate in the WFDNW as a child station.

In subsequent S16 and S40, the CPU 30 monitors receiving either of AP setting information or a disconnection request from the PC 50 by using the WFD connection. Specifically, in S16, whether or not the AP setting information is received from the PC 50 using the WFD connection is determined. The AP setting information is wireless setting information being used in the APNW in which the PC 50 is currently participating as the child station (i.e., APNW being formed by the AP 90), and includes an SSID, a password, an authentication scheme, an encryption scheme, etc. The authentication scheme and the encryption scheme are respectively schemes for performing authentication and encryption in a wireless network. In a modification, the AP setting information may be wireless setting information being used in an APNW in which the PC 50 had participated in the past.

For example, in a case where the WFD connection between the MFP 10 and the PC 50 has unstable communication environment and/or in a case where it is impossible for the PC 50 to read out the memory storing the AP setting information, the CPU 30 may receive the disconnection request from the PC 50 without receiving the AP setting information (NO in S16). In S40 the CPU 30 proceeds to determine, in the case where NO is determined in S16, specifically, whether or not the disconnection request is received from the PC 50 using the WFD connection. In a case where the disconnection request is received, the CPU 30 determines YES in S40 and proceeds to S42. In addition, in S40, whether or not a predetermined time has elapsed without receiving either of the AP setting information or the disconnection request from the PC 50 is also determined. For example, in a case where another malfunction (e.g., power off, breakdown of wireless I/F, etc.) is occurring in the PC 50, the CPU 30 determines that the predetermined time has elapsed without receiving either of the AP setting information or the disconnection request from the PC 50 (YES in S40), and proceeds to S42.

In S42, the CPU 30 disconnects the WFD connection with the PC 50. Specifically, the CPU 30 sends a response to the disconnection request in the case where YES is determined in S40 due to the disconnection request being received. Further, the CPU 30 deletes the SSID and password created in S12 from the memory 32. In addition, the CPU 30 deletes the SSID and password created in S12 from the memory 32 in a case where YES is determined in S40 due to the predetermined time has elapsed.

In subsequent S44, the CPU 30 shifts the operation state of the MFP 10 from the G/O state to the device state while maintaining the state where the WFD UN is on. Then, the CPU 30 returns to the monitoring of S10. In this case, the CPU 30 is able to receive the probe request from the PC 50 again (YES in S10), and re-perform the processes from S12 and onward.

On the other hand, when the AP setting information is received from the PC 50, the CPU 30 determines YES in S16, and proceeds to S18. In S18, the CPU 30 disconnects the WFD connection with the PC 50 by performing receiving the disconnection request from the PC 50 and sending a response to the PC 50 and deleting the SSID and password created in S12 from the memory 32. In subsequent S20, the CPU 30 shifts the WFD I/F from on to off. As described above, the wireless I/F 20 is incapable of performing concurrently the AP communication and the WFD communication. The WFD communication will no longer be performed after having performed the processes of S18 and S20. Due to this, the CPU 30 is able to establish the AP connection with an AP (e.g., AP 90) via the wireless I/F 20 to perform the AP communication appropriately. In a modification, the CPU 30 may forcibly disconnect the WFD connection with the PC 50 by skipping S18 and proceeding to S20 where the CPU 30 shifts the WFD I/F from on to off after receiving the AP setting information from the PC 50 (YES in S16).

In S22, the CPU 30 broadcasts a probe request. The probe request is a signal for searching for an AP (e.g., AP 90) existing around the MFP 10. Each AP existing around the MFP 10 sends the probe response to the MFP 10 when receiving the probe request. The response includes an SSID and setting schemes (authentication scheme and encryption scheme) that are currently being used in the APNW formed by the AP from which the response has been sent.

In subsequent S24, the CPU 30 determines whether or not an AP (hereafter "target AP") forming the APNW identified by the SSID received in S16 (hereafter, "target SSID") exists around the MFP 10. Specifically, the CPU 30 determines whether or not a response including the target SSID is included in the responses received from the respective APs. In a case where the response including the target SSID is included (i.e., the target AP is found), the CPU 30 determines YES in S24 and proceeds to S26. Contrary to this, in a case where there is no response including the target SSID (i.e., the target AP is not found), the CPU 30 determines NO in S24 and proceeds to S50.

In S50, the CPU 30 shifts the WFD I/F from off to on. Then, the CPU 30 returns to the monitoring of S10. In this case, the CPU 30 is able to receive the probe request from the PC 50 again (YES in S10), and re-perform the processes from S12 and onward.

In S26, the CPU 30 determines whether or not the MFP 10 supports the setting schemes (i.e., authentication scheme and encryption scheme) received in S16. A list of the setting schemes the MFP 10 supports has been stored in the memory 32 in advance.

Here, the setting schemes will be described in detail. The authentication scheme is categorized into either of a personal type authentication scheme or an enterprise type authentication scheme. The personal type authentication scheme is further categorized into four types, namely, WPA-PSK (abbreviation of Wi-Fi Protected Access-Pre-Shared Key), WPA2-PSK (abbreviation of Wi-Fi Protected Access 2-Pre-Shared Key), Open, and Shared key. The enterprise type authentication scheme is further categorized into two types, namely, WPA-Enterprise and WPA2-Enterprise. Then, both of the WPA-Enterprise and WPA2-Enterprise are further categorized into four types, namely EAP-FAST (abbreviation of Extensible Authentication Protocol-Flexible Authentication via Secured Tunnel), PEAP (Protected EAP), EAP-TTLS (EAP-Tunneled Transport Layer Security), and EAP-TLS (EAP-Transport Layer Security). The encryption scheme is categorized into three types, namely, TKIP (Temporal Key Integrity Protocol), AES (Advanced Encryption Standard), and WEP (Wired Equivalent Privacy).

In S26, the CPU 30 determines whether or not the setting schemes received in S16 are stored in the memory 32. In a case where the received setting schemes are stored in the memory 32, the CPU 30 determines YES in S26 and proceeds to S28. On the other hand, in a case where the received setting schemes are not stored in the memory 32, the CPU 30 determines NO in S26 and terminates the processes of FIG. 2 while maintaining the state where the WFD I/F is off. For example, in a case where the authentication scheme in the received setting schemes indicates an enterprise authentication scheme under a situation where the personal type authentication schemes only are stored in the memory 32, the CPU 30 determines NO in S26. Similarly for example, in a case where the encryption scheme in the received setting schemes indicates "TKIP" under a situation where the encryption scheme "AES" only is stored in the memory 32, the CPU 30 determines NO in S26.

In S28, the CPU 30 establishes an AP connection with the target AP using the AP setting information received in S16. Specifically, the CPU 30 performs communication of various signals (e.g., Authentication signal, Association signal, 4-way handshake, etc.) with the target AP. At this occasion, signals unique to the WFD scheme (e.g., Provision Discovery signal) are not communicated. During the course of communicating the above various signals, the CPU 30 sends the received AP setting information to the target AP to cause the target AP to perform the authentication of the AP setting information, i.e., cause the target AP to authenticate the MFP 10. Due to this, the CPU 30 establishes the AP connection with the target AP to cause the MFP 10 to participate in the APNW as a child station. After finishing S28, the processes of FIG. 2 are terminated while the state where the WFD I/F is off. In this case, the CPU 30 is able to perform the AP communication using the AP connection with the PC 50 via the target AP. Due to this, the CPU 30 is able to receive print data from the PC 50 by the AP communication and cause the print performing unit 16 to execute printing of the print data, and also to send scan data to the PC 50 by the AP communication, using the scan data that has been created by a scan performed at the scan performing unit 18.

Figure 3:
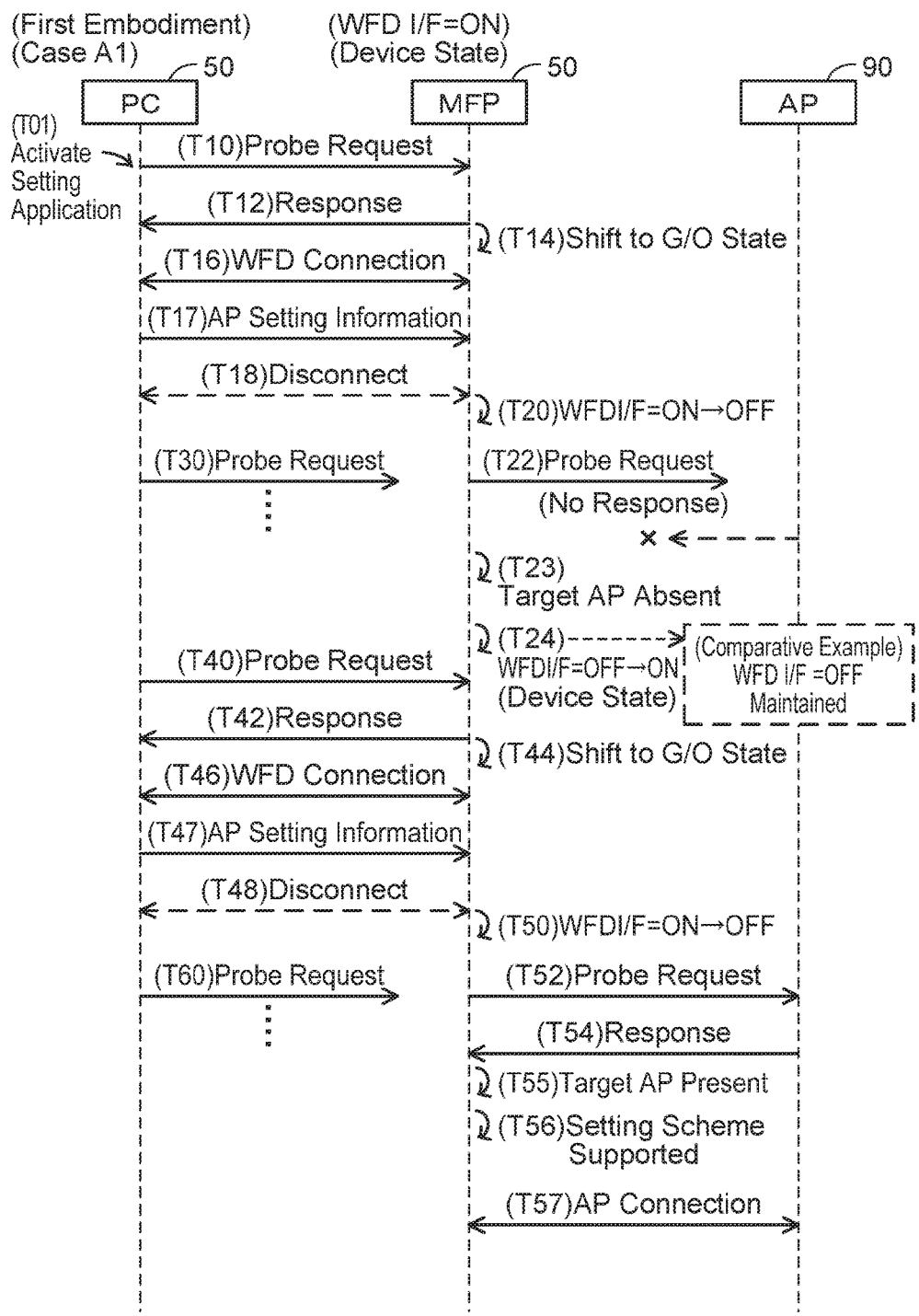
FIG. 3 illustrates a sequence diagram of Case A1 in which AP is not found.
Figure 4:
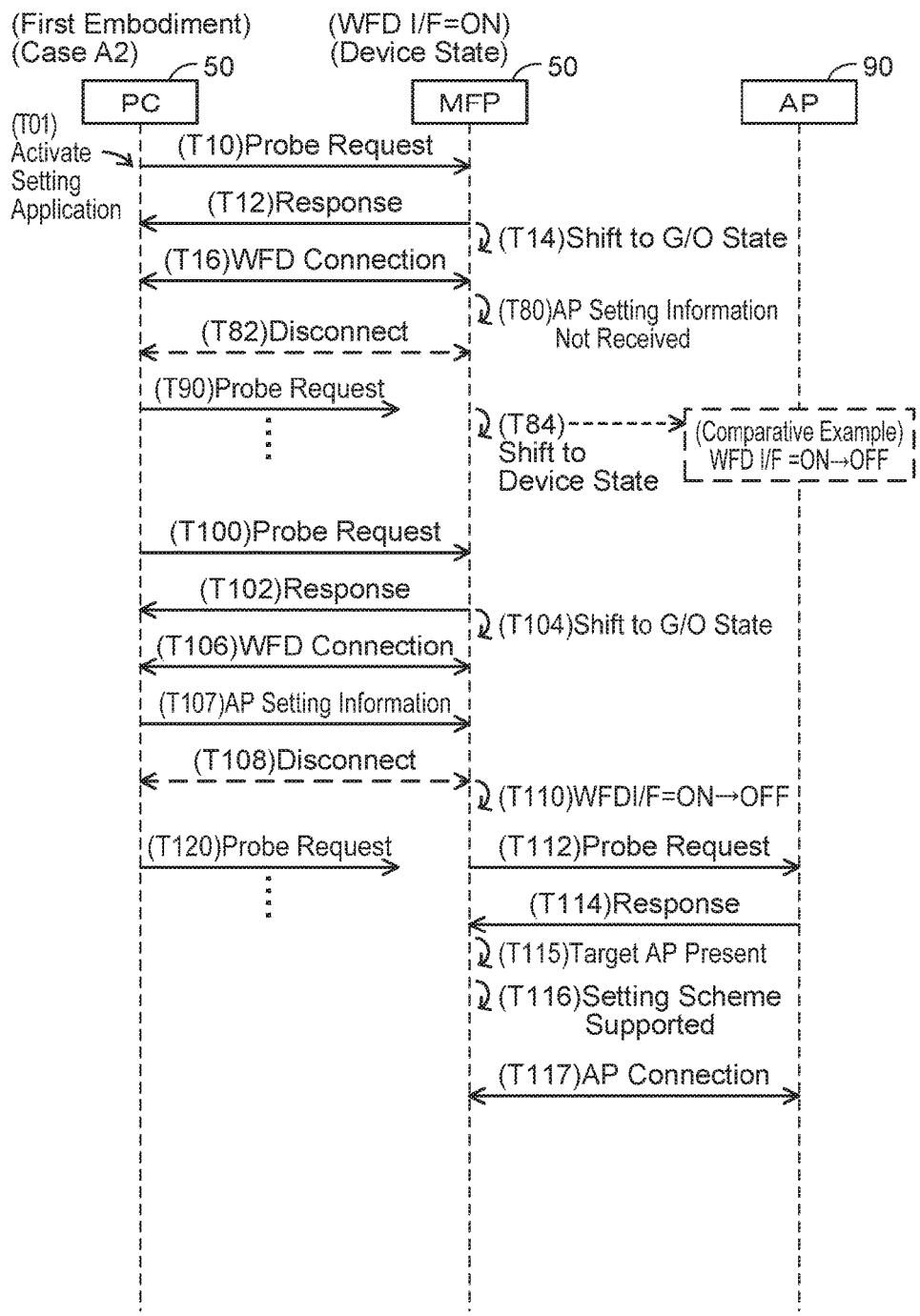
FIG. 4 illustrates a sequence diagram of Case A2 in which AP setting information is not received.
Figure 5:
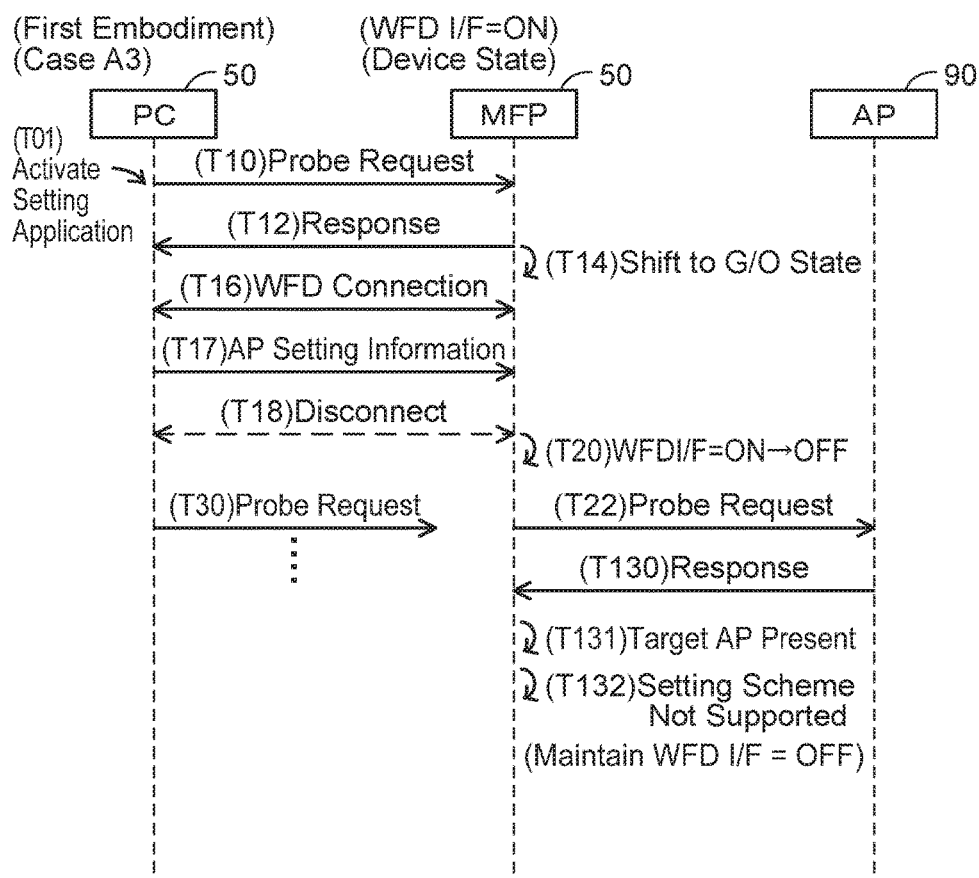
FIG. 5 illustrates a sequence diagram of Case A3 in which AP setting schemes are not supported.

(Specific Cases; FIGS. 3 to 5)

Specific cases A1 to A3 realized by the processes of FIG. 2 will be explained with reference to FIGS. 3 to 5. In an initial state of each of Cases A1 to A3, the PC 50 has established the AP connection with the AP 90, and the MFP 10 is operating in the device state in the state the WFD I/F is on.

(Case A1; FIG. 3)

In Case A1, although the establishment of the AP connection between the MFP 10 and the AP 90 fails due to the target AP (i.e., AP 90) being absent (NO in S24 of FIG. 2), thereafter the establishment of the AP connection succeeds.

In T01, the user activates the setting application 52 by operating the operation unit of the PC 50. Due to this, the PC 50 performs the following respective processes in accordance with the setting application 52. In T10, the PC 50 broadcasts the probe request.

The MFP 10 sends the probe response to the PC 50 (S12) when receiving the probe request of T10 from the PC 50 (YES in S10 of FIG. 2). Then, the MFP 10 shifts to the G/O state (S12) in T14, and establishes the WFD connection with the PC 50 (S14) in T16.

In T17, the PC 50 sends the AP setting information currently being used in the AP 90 to the MFP 10 by using the WFD connection.

Upon receiving the AP setting information of T17 from the PC 50 (YES in S16), in T18 the MFP 10 disconnects the WFD connection with the PC 50 (S18), and in T20 shifts the WFD I/F from on to off (S20). In subsequent T22, the MFP 10 broadcasts the probe request. For example, the MFP 10 cannot receive the probe request from the AP 90 due to reasons such as a distance between the MFP 10 and the AP 90 being great, or communication between the MFP 10 and the AP 90 having unstable connectivity, etc., and in T23 the MFP 10 determines that the target AP (i.e., AP 90) is absent (NO in S24). In this case, in T24, the MFP 10 shifts the WFD I/F from off to on, and operates in the device state (S50).

As indicated in T30 and T40, the PC 50 repeats the broadcasting of the probe request after the WFD connection with the MFP 10 has been disconnected (T18). In a modification, the PC 50 may operate to wait for a predetermined timeout period to elapse after the disconnection of the WFD connection with the MFP 10, and thereafter send the probe request again.

The MFP 10 receives the probe request of T40 again from the PC 50 after the WFD I/F has been turned on in T24. The subsequent processes of T42 to T50 are the same as the above T12 to T20.

In T52, the MFP 10 broadcasts the probe request again (S22). At this timing, since the MFP 10 has been brought closer to the AP 90, or the communication situation between the MFP 10 and the AP 90 has been corrected, in T54 the MFP 10 receives the probe response from the AP 90, in T55 determines that the target AP (i.e., AP 90) that is using the SSID included in the AP setting information received in T47 is present (YES in S24). Then, in T56 the MFP 10 determines that the MFP 10 supports the setting schemes of the target AP (YES in S26), and in T57 establishes the AP connection with the AP 90 using the received AP setting information.

It should be noted that as indicated in T60, the PC 50 repeats the broadcast-sending of the probe request after the WFD connection with the MFP 10 has been disconnected (T48). The PC 50 terminates the sending of the probe request after the predetermined timeout period has elapsed without receiving the response from the MFP 10.

In a comparative example, in the case where the target AP is absent (T23), the MFP 10 maintains the state where the WFD I/F is off. In this case, the MFP 10 cannot perform the Listen process (T40, T42). Due to this, in order to establish the AP connection between the MFP 10 and the AP 90, the user needs to perform the predetermined operation for turning on the WFD I/F (trigger of FIG. 2) to the MFP 10. Contrary to this, in the present embodiment, in the case where it is determined that the target AP is absent (T23), the MFP 10 shifts the WFD I/F from off to on (T24). That is, the MFP 10 automatically turns the WFD I/F on even without the predetermined operation being performed by the user. Due to this, the MFP 10 is able to establish the AP connection with the AP 90 automatically (T57) even without an instruction being inputted by the user in the case where the establishment of the AP connection with the AP 90 fails due to the target AP being absent (T23). Therefore, user convenience can be improved in a situation where the MFP 10 should establish the AP connection with the AP 90.

(Case A2; FIG. 4)

In Case A2, although the establishment of the AP connection between the MFP 10 and the AP 90 fails due to the MFP 10 being unable to receive the AP setting information from the PC 50 (YES in S40 of FIG. 2), thereafter the establishment of the AP connection succeeds.

Processes of T01, T10 to T16 are the same as FIG. 3. In the present case, since a malfunction has occurred in the PC 50 (e.g., the memory storing the AP setting information is impossible to be read) after the WFD connection (T16) has been established between the MFP 10 and the PC 50, the PC 50 sends the disconnection request to the MFP 10 without sending the AP setting information to the MFP 10.

As indicated in T80, the MFP 10 is unable to receive the AP setting information from the PC 50, and in T82 disconnects the WFD connection with the PC 50 (YES in S40, S42). In subsequent T84, the MFP 10 shifts the G/O state to the device state (S44) while maintaining the state where the WFD I/F is on.

As indicated in T90 and T100, the PC 50 repeats the broadcast-sending of the probe request after the WFD connection with the MFP 10 has been disconnected (T80).

The MFP 10 receives the probe request of T100 from the PC 50 again. In the processes of subsequent T102 to T117 and T120 are the same as the processes of T42 to T57 and T60 of FIG. 3. In the present case, since the malfunction of the PC 50 has been resolved, the MFP 10 receives the AP setting information of T107 from the PC 50 (YES in S16 of FIG. 2), and establishes the AP connection with the AP 90 (T117, S28 of FIG. 2).

In a comparative example, in the case where the AP setting information cannot be received from the PC 50 (T80, T82), the MFP 10 shifts the WFD I/F from on to off. In this case, the MFP 10 cannot perform the Listen process (T40, T42). Due to this, in order to establish the AP connection between the MFP 10 and the AP 90, the user needs to perform the predetermined operation for turning the WFD I/F on (trigger of FIG. 2) to the MFP 10. Contrary to this, in the present embodiment, the MFP 10 maintains the state where the WFD I/F is on (T84) in the case where the AP setting information cannot be received from the PC 50 (T80, T82). That is, the MFP 10 automatically turns the WFD I/F on even without the predetermined operation being performed by the user. Due to this, the MFP 10 is able to establish the AP connection with the AP 90 automatically (T117) even without an instruction being inputted by the user in the case where the establishment of the AP connection with the AP 90 fails due to the AP setting information being impossible to be received from the PC 50 (T80). Therefore, user convenience may be improved in a situation where the MFP 10 should establish the AP connection with the AP 90.

(Case A3; FIG. 5)

In Case A3, the establishment of the AP connection between the MFP 10 and the AP 90 fails due to the MFP 10 not supporting the setting schemes of the target AP (i.e., AP 90) (NO in S26 of FIG. 2).

Processes of T01, T10 to T22 are the same as FIG. 3. The MFP 10 determines in T131 that the target AP (i.e., AP 90) is present (YES in S24 of FIG. 3) if the MFP 10 receives the probe response from the AP 90 in T130. The MFP 10 determines in T132 that the MFP 10 does not support the setting schemes of the target AP (NO in S26). In this case, the MFP 10 maintains the state where the WFD I/F is off. Due to this, the MFP 10 cannot receive the probe request of T30 from the PC 50, as a result of which the MFP 10 cannot establish the AP connection with the AP 90.

In the case where the MFP 10 does not support the setting schemes of the target AP, the MFP 10 cannot establish the AP connection with the target AP. Due to this, in the case where the MFP 10 fails to establish the AP connection due to not supporting the setting schemes of the target AP, the MFP 10 maintains the WFD I/F to be off. Due to this, the MFP 10 is prevented from reestablishing the WFD connection with the PC 50. Thus, processing load imposed upon the MFP 10 can be reduced.

Effects of Present Embodiment

In a case where a conventional MFP not comprising the configuration of the present embodiment is used, the user had needed to operate an operation unit to input the AP setting information to the MFP so as to establish AP connection with an AP. Even if the user uses an automatic wireless setting function (e.g., WPS, AOSS (abbreviation of Airstation One-touch Secure System)) comprised by the conventional MFP, the user had needed to operate push buttons and/or input a PIN code. In the conventional MFP, the user having poor knowledge of wireless connection had difficulty in establishing the AP connection.

Contrary to this, in the present embodiment, when the MFP 10 is newly installed in an environment in which the PC 50 has established the AP connection with the AP 90 (e.g., home LAN (abbreviation of Local Area Network) environment), the user is able to establish the AP connection automatically with the AP 90 (S28) by activating the setting application 52 installed in the PC 50 and turning on the power of the MFP 10 for the first time since the shipment (or performing the predetermined trigger operation of FIG. 2) to receive the AP setting information from the PC 50 (YES in S16). Therefore, the user is able to easily establish the AP connection between the MFP 10 and the AP 90 according to the MFP 10 of the present embodiment.

Then, in the present embodiment, in the case where the establishment of the AP connection fails due to the target AP being absent (T23 of FIG. 3) or due to the AP setting information being impossible to be received from the PC 50 (T80 of FIG. 4), the MFP 10 causes the WFD I/F to operate in the state where the WFD I/F is on even without an instruction being inputted by the user (T24 of FIG. 3 and T84 of FIG. 4). Therefore, user convenience may be improved in the state where the MFP 10 should establish the AP connection with the target AP.

(Correspondence Relationships)

The MFP 10 and the PC 50 are examples of "a communication apparatus" and "an external apparatus", respectively. The WFD connection between the MFP 10 and the PC 50 and the AP connection between the MFP 10 and the AP 90 are examples of "a first wireless connection" and "a second wireless connection", respectively. The AP setting information is an example of "setting information". Processes of S10, S12 of FIG. 2 are an example of "a specific process". The state where the WFD I/F is on and the state where the WFD I/F is off are examples of "able state" and "unable state", respectively. The process of S16 of FIG. 2 is an example of "a receiving process". The processes of S22 to S28 are an example of "an establishing process". The processes of S22 and S24 are an example of "a search process". The process of S26 is an example of "a determination process".

Second Embodiment

In the present embodiment, the wireless I/F 20 of the MFP 10 is capable of concurrently performing the AP communication and the WFD communication. Due to this, a part of the content of the wireless setting process performed by the CPU 30 (see FIG. 2) is different from that of the first embodiment. In the present embodiment, the CPU 30 skips S20 (i.e., maintaining the state where the WFD I/F is on) after the WFD connection with the PC 50 has been disconnected in S18, and proceeds to S22. Then, In S50 (i.e., NO in S24), the CPU 30 maintains the state where the WFD I/F is on and shifts the operating state of the MFP 10 from the G/O state to the device state. Further, in S60, the CPU 30 shifts the WFD I/F from on to off in a case where NO is determined in S26 (i.e., in the case where the MFP 10 does not support the setting schemes of the target AP). Moreover, in S30 the CPU 30 shifts the WFD I/F from on to off after the AP connection has been established with the target AP in S28. In the present embodiment, by the WFD I/F being turned off in S30, the CPU 30 can be suppressed from needlessly receiving the probe request from the external apparatus and sending the probe response, suppressing an increase in load of the wireless I/F 20.

Figure 6:
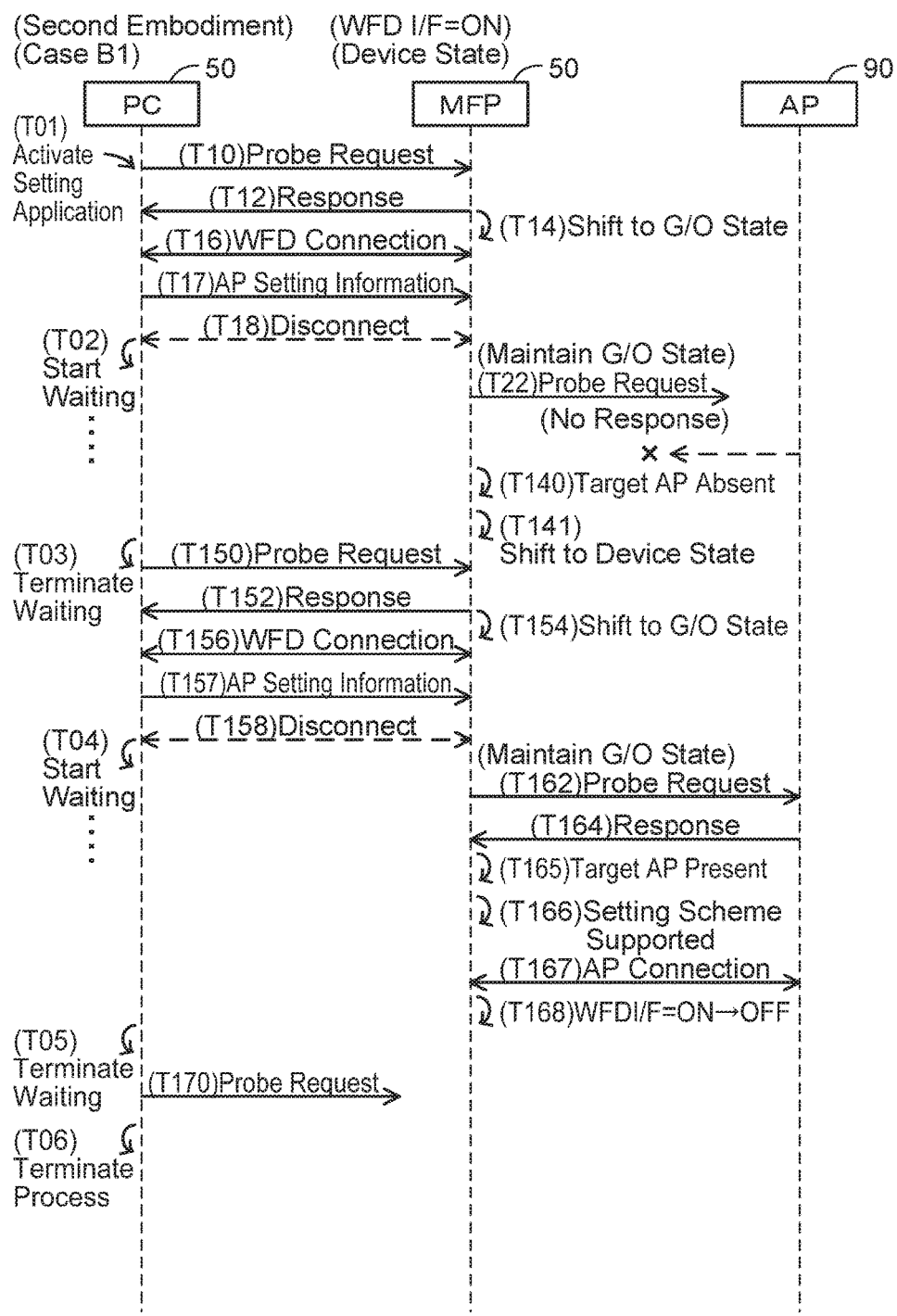
FIG. 6 illustrates a sequence diagram of Case B1 of a second embodiment in which AP is not found.
Figure 7:
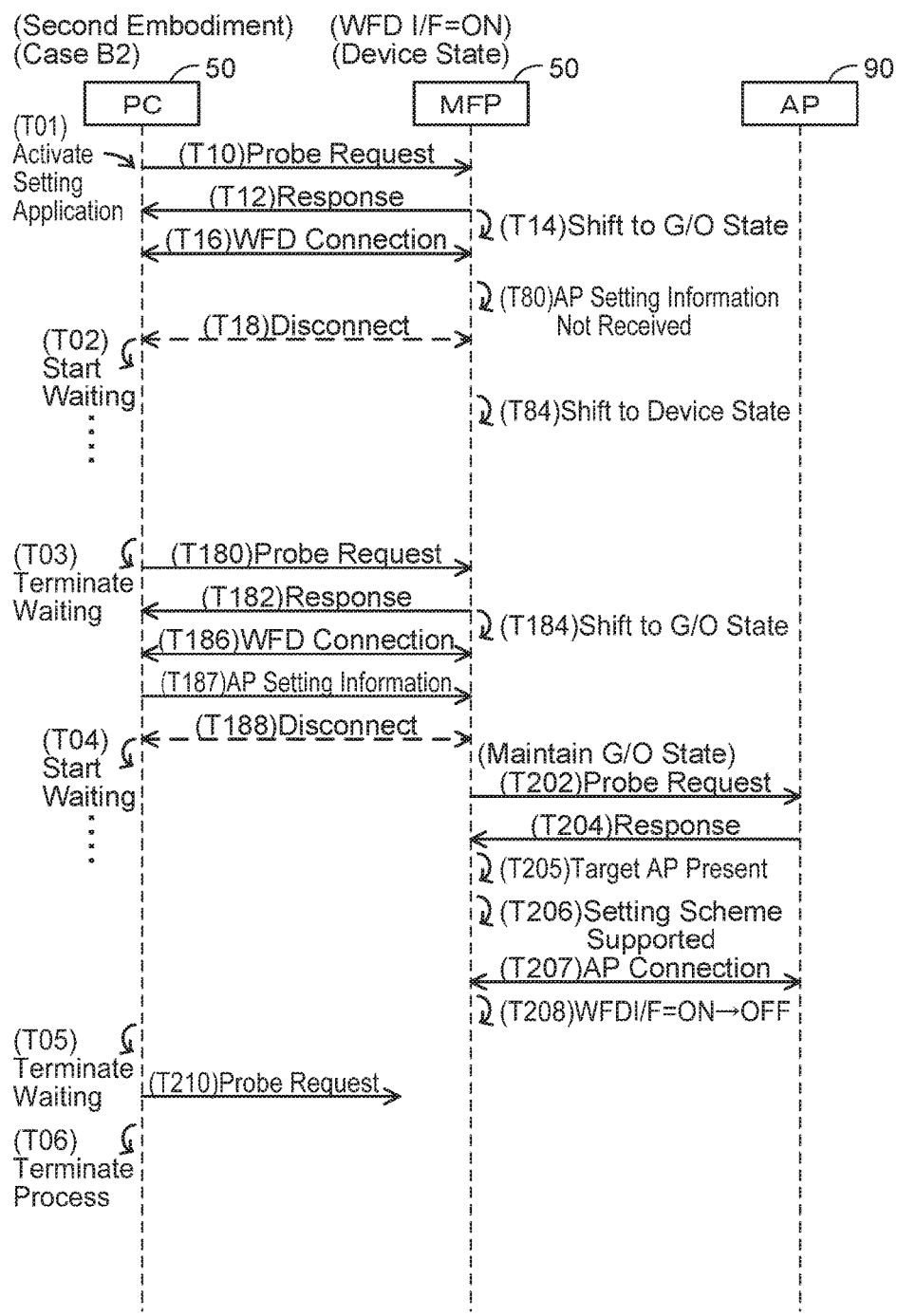
FIG. 7 illustrates a sequence diagram of Case B2 of the second embodiment in which AP setting information is not received.

(Specific Cases; FIGS. 6 to 8)

Subsequently, with reference to FIGS. 6 to 8, specific cases B1 to B3 realized by the present embodiment will be described, mainly focusing on different points from the respective cases A1 to A3 of the first embodiment.

(Case B1; FIG. 6)

In Case B1, although the establishment of the AP connection between the MFP 10 and the AP 90 fails due to the target AP (i.e., AP 90) being absent (NO in S24 of FIG. 2), thereafter the establishment of that AP connection succeeds. Processes of T01, T10 to T18 are the same as FIG. 3.

In the present case, the MFP 10 maintains the state of the WFD I/F to be on after the WFD connection with the PC 50 has been disconnected in T18, and continues the operation of the G/O state. Then, in T22 the MFP 10 broadcasts the probe request. For example, the MFP 10 is unable to receive the probe response from the AP 90 due to reasons such as a distance between the MFP 10 and the AP 90 being great, communication situation between the MFP 10 and the AP 90 being not good, etc., and in T140 the MFP 10 determines that the target AP (i.e., AP 90) is absent (NO in S24). Then, in T141, the MFP 10 shifts the operating state of the MFP 10 from the G/O state to the device state (S50).

In the present embodiment, the PC 50 starts waiting until a predetermined timeout period elapses in T02 after the WFD connection with the MFP 10 has been disconnected (T18). Then, the PC 50 broadcasts the probe request again in T150 when the waiting has finished in T03.

The MFP 10 receives the probe request of T150 again from the PC 50. Processes of T152 to T158 are the same as T10 to T18 as above. In T162, similarly to T22, the MFP 10 broadcasts the probe request via the wireless I/F 20. At this timing, since the MFP 10 has been brought closer to the AP 90, or the communication situation between the MFP 10 and the AP 90 has been corrected, in T164 the MFP 10 receives the probe response from the AP 90. Processes of subsequent T165 to T167 are the same as T55 to T57 of FIG. 3. Then, in T168, the MFP 10 shifts the WFD I/F from on to off (S30).

Notably, as indicated in T04 and T05, the PC 50 broadcasts the probe request again in T170 after waiting again until the elapse of the predetermined timeout period after the WFD connection with the MFP 10 has been disconnected (T158). It should be noted however that since the WFD I/F of the MFP 10 has been turned off at this timing, the PC 50 terminates the processes at T06 without receiving a response from the MFP 10.

(Case B2; FIG. 7)

In Case B2, although the establishment of the AP connection between the MFP 10 and the AP 90 fails due to the MFP 10 being unable to receive the AP setting information from the PC 50 (YES in S40 of FIG. 2), thereafter the establishment of the AP connection succeeds. Processes of T01, T10 to T16, and T80 to T84 are the same as FIG. 4. Further, processes of T02 and T03 are the same as FIG. 6. Processes of T180 to T210 are the same as the processes of T150 to T170 of FIG. 6. Processes of T04 to T06 are also the same as FIG. 6.

(Case B3; FIG. 8)

In case B3, the establishment of the AP connection between the MFP 10 and the AP 90 fails due to the MFP 10 not supporting the setting schemes of the target AP (i.e., AP 90) (NO in S26 of FIG. 2). Processes of T01, T10 to T18, and T22 are the same as FIG. 6. Processes of T02, T03, and T06 are the same as FIG. 6. A process of T230 is the same as T170 of FIG. 6.

Upon receiving the probe response from the AP 90 in T220, in T221 the MFP 10 determines that the target AP (i.e., AP 90) is present (YES in S24). Then, in T222, the MFP 10 determines that the MFP 10 does not support the setting schemes of the target AP (NO in S26). In this case, in T224 the MFP 10 shifts the WFD I/F from on to off (S60). Due to this, the MFP 10 is unable to receive the probe request of T230 from the PC 50, as a result of which the AP connection with the AP 90 cannot be established.

Specific examples of the present invention have been described in detail, however, these are mere exemplary indications and thus do not limit the scope of the claims. The art described in the claims include modifications and variations of the specific examples presented above. Modifications for the above embodiments will be listed hereinbelow.

(Modification 1) In the second embodiment, the CPU 30 may omit the process of S18 of FIG. 2 (i.e., disconnection of the WFD connection). That is, in the present modification, "disconnecting the first wireless connection in the case where the setting information is received from the external apparatus as the result of the receiving process being attempted" may be omitted.

(Modification 2) The CPU 30 may not perform S22 and S24, and may send a connection request including the SSID of the target AP and establish the AP connection with the target AP. That is, in the present modification, "a search process" may be omitted.

(Modification 3) In a case where all setting schemes that may be conceivable are supported by the MFP 10, the CPU 30 may not perform S26. That is, in the present modification, "a determination process" may be omitted.

(Modification 4) The I/F for the AP communication and the I/F for the WFD communication may be physically different from each other.

(Modification 5) In the case where it is determined in the first embodiment that the MFP 10 does not support the setting schemes of the target AP (NO in S26), the CPU 30 may shift the WFD I/F from off to on. Similarly, in case of NO in S26 in the second embodiment, the CPU 30 may maintain the state where the WFD I/F is on.

(Modification 6) In the case where the AP setting information is not received from the PC 50 (NO in S16 and YES in S40), the CPU 30 may shift the WFD I/F from on to off.

(Modification 7) In the first embodiment, after the WFD I/D had been shifted from on to off in S20, the CPU 30 may shift the WFD I/F from off to on again before NO is determined in S24.

(Modification 8) In the case where it is determined in the first embodiment that the target AP is absent (NO in S24), the CPU 30 may maintain the state where the WFD I/F is off. Similarly, in the second embodiment, in case of NO in S24, the CPU 30 may shift the WFD I/F from on to off.

(Modification 9) In S44, instead of maintaining the state where the WFD I/F is on, the CPU 30 may shift the WFD I/F from on to off, and then bring the WFD I/F back on. This modification is also an example of "in the case where the setting information is not received from the external apparatus, controlling the state of the wireless interface to operate in the capable state after the first wireless connection has been disconnected" Notably, the above is not limited to S44, and instead of "maintaining" the state where the WFD I/F is on or off, the WFD I/F may be shifted to on or off and then again be brought back to on or off, respectively at the timing after NO is determined in S26 in the first embodiment, the timing after S18 of the second embodiment, S50, etc.

(Modification 10) The probe request of S22 may include the SSID of the target AP. In this case, the target AP only is able to send the response to the MFP 10. In S24, the CPU 30 may determine whether or not the target AP is present by determining whether or not the response is received from the target AP. The present modification is also an example of the "search process".

(Modification 11) The setting application 52 may operate in an establishing mode of establishing the WFD connection with the MFP 10 in a case where the SSID of the WFDNW formed by the MFP 10 is a predetermined SSID, while the setting application 52 may not operate in the establishing mode in a case where the SSID of the WFDNW is a different SSID from the predetermined SSID. In this case, in S12 of FIG. 2, the CPU 30 creates the aforementioned predetermined SSID as the SSID of the WFDNW of the MFP 10. Then in S20, S30, and S60, the CPU 30 changes the aforementioned predetermined SSID to another SSID by not turning off the WFD I/F and maintaining the WFD I/F to be on. In this case, the PC 50 does not establish the WFD connection with the MFP 10 in accordance with the setting application 52. That is, the MFP 10 is incapable of establishing the WFD connection with the PC 50. In the present modification, the state of the WFD I/F where the aforementioned predetermined SSID is used and the state of the WFD I/F where another SSID is used are examples of "a capable state" and "an incapable state", respectively.

(Modification 12) The CPU 30 may not shift to the G/O state in S12 after sending the response. In this case, the CPU 30 may perform a G/O negotiation with the PC 50.

(Modification 13) The PC 50 may perform SNMP broadcast via the target AP (i.e., AP 90) after sending the AP setting information to the MFP 10, and determine whether or not the AP connection between the MFP 10 and the AP 90 has been established.

(Modification 14) In each of the above embodiments, the MFP 10 (i.e., wireless I/F 20) is compliant with the WFD scheme and establishes the WFD connection with the PC 50 to receive the AP setting information from the PC 50. The communication for receiving the AP setting information from the PC 50 may not be limited to the wireless communication in accordance with the WFD scheme, but may be wireless communication in accordance with another scheme. Therefore, for example, the MFP 10 may comprise a BT I/F capable of performing wireless communication compliant with Bluetooth (registered trademark, hereafter "BT"). In this case, the CPU 30 may establish BT connection with the PC 50 and receive the AP setting information from the PC 50 using the BT connection. Further, for example, the MFP 10 may comprise a NFC (abbreviation of Near Field Communication) I/F capable of performing wireless communication compliant with NFC scheme. The CPU 30 may establish NFC connection with the PC 50 and receive the AP setting information from the PC 50 using the NFC connection. Further, for example, the communication for receiving the AP setting information from the PC 50 may be wireless communication in accordance with the normal Wi-Fi scheme. For example, the MFP 10 may be capable of operating as a SoftAP. In this case, the CPU 30 establishes SoftAP connection with the PC 50 (i.e., causing the PC 50 to participate as a child station in a SoftAPNW formed by the MFP 10) while operating as the SoftAP and receive the AP setting information from the PC 50 using the SoftAP connection. This modification is also an example of the "receiving process".

(Modification 15) In each of the above embodiments, each process of FIG. 2 is realized by software (i.e., a program), but alternatively at least one of the respective processes in FIG. 2 may be realized by hardware such as a logic circuit, etc.

What is claimed is:

1. A communication apparatus comprising:
   a wireless interface configured to operate in any one of a plurality of states including a capable state where the wireless interface is capable of performing a specific process for establishing a first wireless connection with an external apparatus and an incapable state where the wireless interface is incapable of performing the specific process;
   a processor; and
   a memory storing computer-readable instructions therein, the computer-readable instructions, when executed by the processor, causing the communication apparatus to perform:
   establishing the first wireless connection with the external apparatus via the wireless interface while the wireless interface is operating in the capable state;
   attempting a predetermined process including a receiving process and an establishing process in a case where the first wireless connection is established with the external apparatus, the receiving process being for receiving setting information from the external apparatus by using the first wireless connection, and the establishing process being for establishing a second wireless connection with an access point different from the external apparatus via the wireless interface by using the setting information;
   controlling the wireless interface to:
      in a case where the second wireless connection is established with the access point as a result of the predetermined process being attempted, operate in the incapable state without an instruction for causing the wireless interface to operate in the incapable state being inputted by a user, and
      in a case where the second wireless connection is not established with the access point as the result of the predetermined process being attempted, operate in the capable state after the first wireless connection has been disconnected without an instruction for causing the wireless interface to operate in the capable state being inputted by the user;

in the case where the second wireless connection is not established with the access point as the result of the predetermined process being attempted, re-establishing the first wireless connection with the external apparatus via the wireless interface while the wireless interface is operating in the capable state after the first wireless connection has been disconnected; and re-attempting the predetermined process in a case where the first wireless connection is re-established with the external apparatus.

2. The communication apparatus as in claim 1, wherein the controlling of the wireless interface further includes,
in a case where the setting information is received from the external apparatus as the result of the receiving process being attempted, changing the state of the wireless interface from the capable state to the incapable state before the establishing process is attempted.

3. The communication apparatus as in claim 2, wherein the controlling of the wireless interface further includes,
in the case where the second wireless connection is not established with the access point as the result of the establishing process being attempted, changing the state of the wireless interface from the incapable state to the capable state.

4. The communication apparatus as in claim 2, wherein the computer-readable instructions, when executed by the processor, cause the communication apparatus to further perform:
disconnecting the first wireless connection in the case where the setting information is received from the external apparatus as the result of the receiving process being attempted,
wherein the controlling of the wireless interface further includes changing the state of the wireless interface from the capable state to the incapable state after the first wireless connection has been disconnected.

5. The communication apparatus as in claim 1, wherein the computer-readable instructions, when executed by the processor, cause the communication apparatus to further perform:
disconnecting the first wireless connection in the case where the setting information is received from the external apparatus as the result of the receiving process being attempted,
wherein the controlling of the wireless interface includes:
in the case where the setting information is received from the external apparatus as the result of the receiving process being attempted, maintaining the state of the wireless interface in the capable state; and
in the case where the second wireless connection is not established with the access point as the result of the establishing process being attempted, maintaining the state of the wireless interface in the capable state.

6. The communication apparatus as in claim 1, wherein the computer-readable instructions, when executed by the processor, cause the communication apparatus to further perform:
disconnecting the first wireless connection in the case where the setting information is not received from the external apparatus as the result of the receiving process being attempted,
wherein the controlling of the wireless interface includes, in the case where the setting information is not received from the external apparatus as the result of the receiving process being attempted, controlling the wireless interface to operate in the capable state after the first wireless connection has been disconnected.

7. The communication apparatus as in claim 1, wherein the establishing process includes a search process using the setting information for searching the access point which is currently using the setting information, and
the controlling of the wireless interface includes:
in the case where the second wireless connection is established with the access point due to the access point being found as a result of the search process, controlling the wireless interface to operate in the incapable state; and
in the case where the second wireless connection is not established with the access point due to the access point being not found as the result of the search process, controlling the wireless interface to operate in the capable state.

8. The communication apparatus as in claim 1, wherein the establishing process includes a search process using the setting information for searching the access point which is currently using the setting information, and a determination process for determining whether the communication apparatus supports a setting scheme being currently used by the access point, and
the controlling of the wireless interface includes:
in the case where the second wireless connection is established with the access point due to the access point being found as a result of the search process and it is determined in the determination process that the communication apparatus supports the setting scheme, controlling the wireless interface to operate in the incapable state; and
in the case where the second wireless connection is not established with the access point due to the access point being found as the result of the search process and it is determined in the determination process that the communication apparatus does not support the setting scheme, controlling the wireless interface to operate in the incapable state.

9. The communication apparatus as in claim 8, wherein the setting scheme includes an authentication scheme and an encryption scheme that are being currently used by the access point.

10. The communication apparatus as in claim 8, wherein the setting scheme includes an authentication protocol being currently used by the access point, and
the authentication protocol is either a personal type authentication protocol or an enterprise type authentication protocol.

11. The communication apparatus as in claim 1, wherein the wireless interface is:
incapable of establishing the second wireless connection with the access point while operating in the capable state; and
capable of establishing the second wireless connection with the access point while operating in the incapable state.

12. The communication apparatus as in claim 1, wherein the controlling of the wireless interface further includes controlling the wireless interface to operate in the capable state, in a case where at least one condition is satisfied among a condition of power of the communication apparatus being turned on and a condition of an instruction for changing the state of the wireless interface from the incapable state to the capable state being inputted by the user.

13. The communication apparatus as in claim 1, wherein the wireless interface for establishing the first wireless connection and the wireless interface for establishing the second wireless connection are integrally configured.

14. The communication apparatus as in claim 1, wherein the specific process includes a process for receiving a probe request and sending a response.

15. A method performed by a communication apparatus, the communication apparatus comprises a wireless interface configured to operate in an any state among a plurality of states including a capable state where the wireless interface is capable of performing a specific process for establishing a first wireless connection with an external apparatus and an incapable state where the wireless interface is incapable of performing the specific process, the method comprising:

establishing the first wireless connection with the external apparatus via the wireless interface while the wireless interface is operating in the capable state;

attempting a predetermined process including a receiving process and an establishing process in a case where the first wireless connection is established with the external apparatus, the receiving process being for receiving setting information from the external apparatus by using the first wireless connection, and the establishing process being for establishing a second wireless connection with an access point different from the external apparatus via the wireless interface by using the setting information;

controlling the wireless interface to:
  in a case where the second wireless connection is established with the access point as a result of the predetermined process being attempted, operate in the incapable state without an instruction for causing the wireless interface to operate in the incapable state being inputted by a user, and
  in a case where the second wireless connection is not established with the access point as the result of the predetermined process being attempted, operate in the capable state after the first wireless connection has been disconnected without an instruction for causing the wireless interface to operate in the capable state being inputted by the user;

in the case where the second wireless connection is not established with the access point as the result of the predetermined process being attempted, re-establishing the first wireless connection with the external apparatus via the wireless interface while the wireless interface is operating in the capable state after the first wireless connection has been disconnected; and re-attempting the predetermined process in a case where the first wireless connection is re-established with the external apparatus.

16. A communication apparatus comprising:

a wireless interface configured to operate in any one of a plurality of states including a capable state where the wireless interface is capable of performing a specific process for establishing a first wireless connection with an external apparatus and an incapable state where the wireless interface is incapable of performing the specific process;

means for establishing a first wireless connection with an external apparatus via the wireless interface while the wireless interface is operating in the capable state;

means for attempting a predetermined process including a receiving process and an establishing process in a case where the first wireless connection is established with the external apparatus, the receiving process being for receiving setting information from the external apparatus by using the first wireless connection, and the establishing process being for establishing a second wireless connection with an access point different from the external apparatus via the wireless interface by using the setting information;

means for controlling the wireless interface to:
  in a case where the second wireless connection is established with the access point as a result of the predetermined process being attempted, operate in the incapable state without an instruction for causing the wireless interface to operate in the incapable state being inputted by a user, and
  in a case where the second wireless connection is not established with the access point as the result of the predetermined process being attempted, operate in the capable state after the first wireless connection has been disconnected without an instruction for causing the wireless interface to operate in the capable state being inputted by the user;

in the case where the second wireless connection is not established with the access point as the result of the predetermined process being attempted, means for re-establishing the first wireless connection with the external apparatus via the wireless interface while the wireless interface is operating in the capable state after the first wireless connection has been disconnected; and means for re-attempting the predetermined process in a case where the first wireless connection is re-established with the external apparatus.

* * * * *